Nov. 21, 1939.   E. J. KEEGAN   2,180,810
PIPE JOINT MOLD
Filed April 7, 1938

Inventor
Edward J. Keegan
By Mason Fenwick & Lawrence
Attorneys

Patented Nov. 21, 1939

2,180,810

UNITED STATES PATENT OFFICE 2,180,810

PIPE JOINT MOLD

Edward J. Keegan, Richmond, Va.

Application April 7, 1938, Serial No. 200,758

5 Claims. (Cl. 25—127)

This invention relates to joint molds for pipe joints of the bell and spigot type. It has for its general object the provision of a mold of the type described, designed to permit the pouring of concrete grout or other joint sealing material in liquid form into the annular space between the bell and spigot.

Another object of the invention is to provide a joint mold which when in place shall constitute a substantially water-tight cofferdam, preventing water from getting into the bottom of the joint and diluting and weakening the grout.

A further object of the invention is to provide a joint mold affording a rigid annular support for the spigot end of the pipe, and properly centering it with respect to the bell.

Still another object of the invention is to provide a joint mold including a pipe-supporting and centering portion in the form of an articulated annulus capable of being spread to facilitate the placing of the same under the pipe, and having sealing material on the surfaces of the articulations which when the annulus is drawn together against the pipe, seals the articulations against seepage of water into the pipe joint. The invention further contemplates a joint mold having the rigid articulated annular pipe-supporting and centering portion as described and provided with a circumferential flexible band secured at one side to said annulus, forming the hinge connections between the sections of said annulus, and capable of being drawn tightly into engagement with the outside surface of the bell, to form a water-tight joint.

Another object of the invention is to provide a joint mold of the character described which terminates in a plane slightly above the horizontal diameter of the pipe joint in connection with which it is employed providing openings on each side into which the liquid grout may be poured, taking full advantage of the force of gravity for insuring that the grout shall completely fill the space between the bell and spigot at the bottom of the pipe.

Other objects of the invention will appear as the following description of a preferred and practical embodiment thereof proceeds.

In the drawing which accompanies and forms a part of the following specification and throughout the several figures of which the same characters of reference have been employed to designate identical parts:

Before adverting to a detailed description of the several figures, it may be stated that the old and customary manner of sealing a joint of the bell and spigot type was to center the spigot in the bell in a more or less haphazard manner so as to provide a grout space all around, between the spigot and the bell, to make a stiff cement grout and to apply it by hand, beneath the pipe pressing it into the joint manually. As a rule this crude expedient of sealing the joint was ineffectual in that it was extremely difficult to fill all the interstices with a grout of such thickness as it was necessary to use and for the further reason that the weight of the pipe supported by the grout tended to squeeze the grout out of place and to open the joint. The result was contamination of the soil around the joint by leakage from the pipe line, the entrance of roots through the joint into the pipe, the growth of which eventually stopped up the pipe line and the infiltration of ground water into the pipe line through the pervious joints. Formerly this last mentioned factor was relatively unimportant, but since the installation of treatment plants which is now a necessity due to the strict laws requiring the sanitary disposal of sewage, engineers are now requiring sewer construction to be absolutely water-tight to prevent leakage infiltration inasmuch as after a period of rainfall the sewage comes to the treatment plants diluted with such an excess quantity of water as to involve an enormous waste of the chemicals employed in the treatment.

In the old method of placing the grout in the lower part of the joint by hand, it was impossible to back-fill the ditch immediately on account of the tendency of the replaced earth to force the soft grout out of the point.

All of these conditions point to the need of a joint mold or cofferdam such as is constituted by the present invention by means of which a soft fluent grout may be employed, which will with certainty reach and fill in an impervious manner the entire space between the bell and spigot, which joint mold centers and supports the weight of the pipe avoiding pressure upon the grout and which excludes any water that may accumulate in the ditch from diluting the grout while the latter is setting, and which may be left permanently in place when desired permitting immediate back-fill of the ditch without the risk of the grout being displaced.

Figure 1:
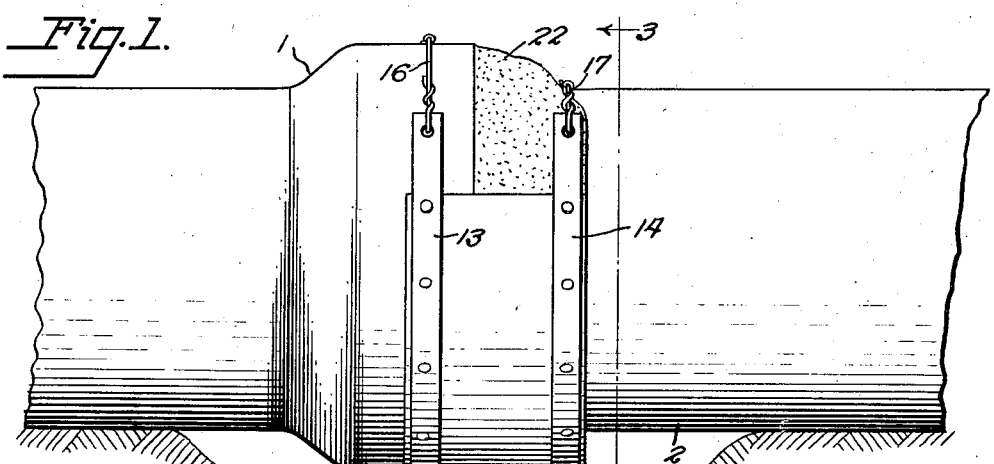
Figure 1 is a longitudinal elevation of a pipe joint illustrating the joint mold of the present invention.

Referring now in detail to the several figures, the numerals 1 and 2 represent respectively, the bell and spigot ends of adjacent pipe sections telescoped to form a joint. It will be understood from Figure 1 that in laying these pipe sections the bottom of the ditch is dug out as indicated at 3 forming a space to receive the joint, the cylindrical portions of the pipe sections lying flat upon the bottom of the ditch and being supported thereby.

The pipe mold constituting the present invention consists, in the preferred embodiment as illustrated, of a sectional annulus which in general is indicated by the reference character 4, there being an underlying section 5 and side sections 6 and 7 which come together in the radial planes of division 8 and 9. In the preferred form of the invention this annulus is incomplete, the terminal ends 10 and 11 of the side sections 6 and 7 being slightly above the horizontal diametrical plane of the pipe joint. The annulus 4 is preferably made of rigid material of sufficient strength to bear the weight of the spigot end of the pipe section and to center the spigot end with respect to the bell end when the joint mold is in place. In the described embodiment of the invention the annulus 4 is made of water-proofed plywood characterized by its resistance to warping.

A wide band 12 of water-proof flexible material is secured along one edge circumferentially to the annulus 4 forming hinge connections at the articulations between the sections 5, 6 and 7. This permits the sections to be spread out into a wide curve to facilitate pushing the joint mold beneath the pipe joint. The band 12 is of such width as to enable it to lap the surface of the bell 1 and at the same time leave the annulus 4 spaced away from the end of the bell a sufficient distance to provide pouring space for the grout. The band 12 may be made of any suitable material such as sheet metal or roofing felt. The latter material is probably best suited for the purpose since it is sufficiently yieldable to conform to irregularities upon the surface of the bell and to form with said bell a water-tight joint when the band 12 is drawn up tightly against the bell.

Figure 3:
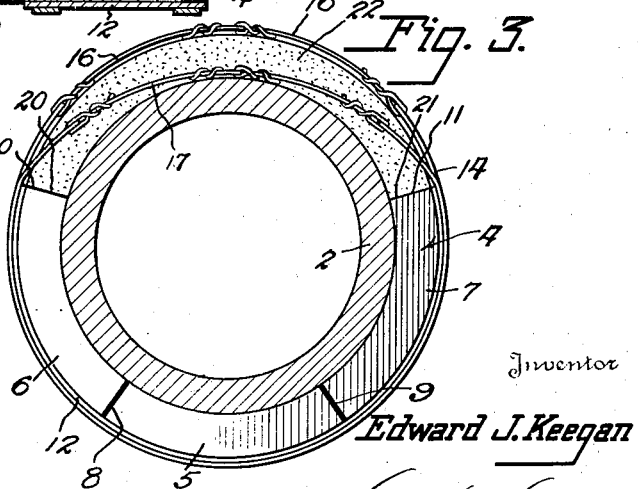
Figure 3 is a cross section taken along the line 3—3 of Figure 1.

In the event that the band 12 is made of roofing felt or other fragile material, it is preferably reinforced at its edges with circumferential strips of metal 13 and 14 which metal strips may project beyond the ends of the band 12 in the form of lugs 15 to which wires 16 and 17 may be attached. The joint mold is secured in place by drawing the wires tight about the pipe and twisting them in the manner indicated in Figures 1 and 3. The wires 16 bear against the upper exposed surface of the bell while the wires 17 engage the exposed surface of the spigot 2.

The end surfaces 18 of the sections 5, 6 and 7 which abut at the articulations are preferably coated with a suitable material so that when they are brought together the articulations are sealed against the seepage of water. This material may be a layer of thin rubber or a cementitious substance such as asphalt which remains tacky from the time of manufacture until the joint mold is used. The annulus 4 and the band 12 are made in various sizes to suit standard sized pipe.

Figure 2:
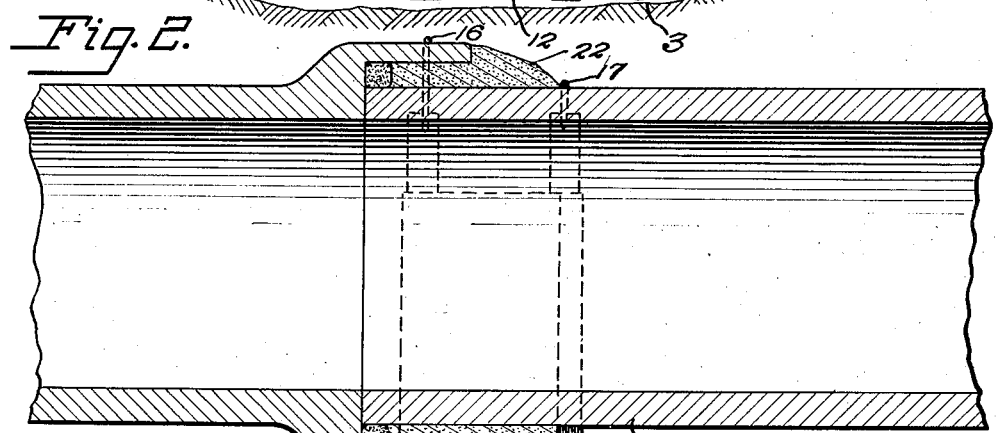
Figure 2 is a vertical section through the same.
Figure 4:
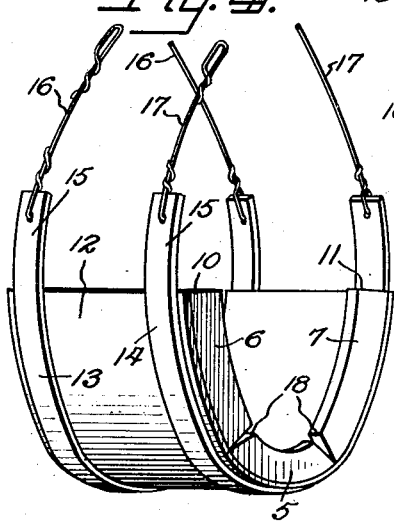
Figure 4 is a perspective view of the joint mold.

Before using the joint mold, a piece of jute packing or its equivalent 19 is placed against the seat at the bottom of the flange of the bell and the mouth of the spigot end of the pipe is placed within the bell resting upon the packing as illustrated in Figure 2. The joint mold in spread position is slipped beneath the joint through the space afforded by the depression 3 in the ditch. It is positioned lengthwise of the joint so that the annulus 4 is spaced the proper distance from the end of the bell. The band 12 is drawn up tight against the surface of the bell by pulling upon the wires 16 and the latter are twisted together to retain the band in place. The annulus 4 is then drawn up about the spigot end of the pipe and secured in similar manner. The clamping of the annulus about the spigot end of the pipe serves the purpose of not only centering the pipe within the bell, but of supporting the weight of the pipe so that it will not press upon the underlying grout. In drawing the joint mold together against the pipe joint, the band 12 makes water-tight contact with the bell and the annulus makes similar water-tight engagement with the spigot. The surfaces 18 at the articulations come together and are made water-tight by the rubber or cementitious substance with which they are covered or coated.

When the joint mold is in this position it acts as a cofferdam preventing water which may accumulate in the ditch from seeping into the grout space and diluting the grout when or after the latter has been poured. The grout which is in liquid form is poured into the space between the bell and spigot through the openings 20 and 21 provided at the opposite ends of the annulus 4. The grout is in liquid condition and is poured in until it rises to the same level on each side which is the indication that the space between the bell and spigot has been completely filled. The upper portion 22 of the grout is a thick mixture which is put in by hand. It is very easy to make a thoroughly impervious seal on the upper side of the joint by the use of this thick mixture and it is much more practical than it would be to extend the annulus to a point closely adjacent the top and to pour the grout into a central aperture, for the grout would then have to flow in both directions substantially horizontally which would impede the flow and make it uncertain whether the joint space had been completely filled.

As a rule the joint mold will be left in place permanently so that if desired the ditch can be immediately back-filled without the pressure of the external earth in any way affecting the seal. If desired, the ditch may be left open and after the grout has set, the joint mold may be removed and repeatedly used.

While I have in the above description disclosed what I believe to be a preferred and practical embodiment of the invention, it will be understood to those skilled in the art that the details of construction and the arrangement of parts as shown are by way of example and not to be construed as limiting the scope of the invention as defined in the appended claims.

What I claim is:

1. Joint mold useful in sealing a pipe joint of the bell and spigot type comprising a semirigid bell-encircling band, an annular spigot centering and supporting member comprising rigid articulated sections having substantially radial abutting faces said faces coated with a normally tacky coating, said sections being secured to one circumferential end of said band, the latter hinging said sections at said articulations so that the annular member can be spread with said band for slipping it beneath the pipe joint, flexible reinforcing hoops secured to said band at its circumferential ends extending beyond the ends of said molds to form lugs, and means attached to said lugs for drawing said band and said annular member into tight fitting engagement with the respective bell and spigot.

2. Joint mold useful in sealing a pipe joint of the bell and spigot type comprising a semi-rigid bell-encircling band adapted to directly embrace the bell, and a member having the shape of an annular segment composed of rigid hingedly abutting sections secured to one circumferential end of said band adapted to embrace and center the spigot, and means for drawing said band and annular member into tight fitting engagement with the respective bell and spigot.

3. Joint mold useful in sealing a pipe joint of the bell and spigot type comprising a semi-rigid bell-encircling band adapted to directly embrace the bell, and a member having the shape of an annular segment composed of rigid hingedly abutting sections secured to one circumferential end of said band, the radial width of said member being equal to the difference between the external radii of the bell and spigot which the mold is designed to fit, and means for drawing said band and said member into tight fitting engagement with the respective bell and spigot.

4. Joint mold useful in sealing a pipe joint of the bell and spigot type comprising a semi-rigid bell-encircling band adapted to directly embrace the bell, and a member having the shape of an annular regment composed of rigid sections having substantially radially abutting faces, said member being secured to one circumferential end of said band, the latter hinging said sections so that the annular member can be spread with said band for slipping said mold beneath the pipe joint, the radial width of said member being equal to the difference between the external radii of the bell and spigot which the mold is designed to fit, and means for drawing said band and said annular member into tight fitting engagement with the respective bell and spigot, said member serving to center said spigot in said bell.

5. Joint mold useful in sealing a pipe joint of the bell and spigot type comprising a semi-rigid bell-encircling band adapted to directly embrace the bell, and a member having the shape of an annular segment composed of rigid sections having substantially radial abutting faces, said member being secured to one circumferential end of said band, the latter hinging said sections at said articulations so that said member can be spread with said band for slipping said mold beneath the pipe joint, the radial width of said member being equal to the difference between the external radii of the bell and spigot which the mold is designed to fit, the abutting faces of said sections being provided with sealing means, and means for drawing said band and said member into tight fitting engagement with the respective bell and spigot, said member functioning to center said spigot in said bell.

EDWARD J. KEEGAN.